United States Patent [19]
Mladenovic et al.

[11] Patent Number: 5,528,069
[45] Date of Patent: Jun. 18, 1996

[54] SENSING TRANSDUCER USING A SCHOTTKY JUNCTION AND HAVING AN INCREASED OUTPUT SIGNAL VOLTAGE

[75] Inventors: Dragan A. Mladenovic; Mahesh Shah, both of Scottsdale, Ariz.

[73] Assignee: Motorola, Inc., Schaumburg, Ill.

[21] Appl. No.: 528,878

[22] Filed: Sep. 15, 1995

Related U.S. Application Data

[63] Continuation of Ser. No. 283,332, Aug. 1, 1994, abandoned.
[51] Int. Cl.$^6$ ................................................ H01L 29/82
[52] U.S. Cl. .................. 257/417; 257/418; 257/420; 257/472; 257/476; 257/484; 257/486; 73/514.16; 73/728; 73/862.473
[58] Field of Search ...................... 257/415, 417, 257/418, 419, 420, 471, 472, 473, 476, 484, 486, 73; 73/704, 720, 721, 726, 727, 722, 728, 514.16, 862.473

[56] References Cited

U.S. PATENT DOCUMENTS

| | | | |
|---|---|---|---|
| 3,634,931 | 1/1972 | Kano et al. | 257/108 X |
| 3,757,173 | 9/1973 | Iijima | 317/234 R |
| 3,757,176 | 9/1973 | Kano et al. | 257/415 |
| 3,786,320 | 1/1974 | Kano et al. | 257/418 |
| 4,764,732 | 8/1988 | Dion | 330/59 |
| 4,943,764 | 7/1990 | Szente et al. | 324/95 |
| 4,965,697 | 10/1990 | Mosser et al. | 361/283 |
| 4,995,953 | 2/1991 | Yee | 204/129.3 |
| 5,101,664 | 4/1992 | Hockaday et al. | 73/704 |

FOREIGN PATENT DOCUMENTS

| | | |
|---|---|---|
| 55-63877 | 5/1980 | Japan . |
| 55-63878 | 5/1980 | Japan . |
| 57-148377 | 9/1982 | Japan . |

OTHER PUBLICATIONS

Murarka, "Refractory Silicides for Integrated Circuits," *J. Vac. Sci. Technol.*, 17(4), Jul./Aug. 1980, pp. 775–793.

Primary Examiner—William Mintel
Attorney, Agent, or Firm—Bruce T. Neel

[57] ABSTRACT

A sensing transducer (10,30) and a method therefor uses a Schottky junction (12) having a conductive layer (16) disposed on a semiconductor substrate (14). The conductive layer (16) is generally formed from the reaction of a metal with a portion of the semiconductor substrate (14). One example of the conductive layer (16) is a metal silicide layer. In one pressure sensing approach, a substantially constant reverse current ($I_1$) is applied to the Schottky junction (12). The change in reverse output voltage of the junction (12) is proportional to the change in pressure on the junction (12) itself, and can thus be used to sense pressure. This output voltage change is significantly higher than that achieved with prior pressure transducers and permits the output signal of the transducer (10,30) according to the present invention to be substantially used without extra amplification or other conditioning.

21 Claims, 3 Drawing Sheets

SENSING TRANSDUCER USING A SCHOTTKY JUNCTION AND HAVING AN INCREASED OUTPUT SIGNAL VOLTAGE

This application is a continuation of prior application Ser. No. 08/283,332, filed Aug. 1, 1994, now abandoned.

BACKGROUND OF THE INVENTION

The present invention relates, in general, to sensing transducers and, more particularly, to a sensing transducer using a Schottky junction as a sensing element.

Sensing transducers are commonly used to sense pressure. Prior pressure transducers typically suffer from an output voltage so low that some type of amplification of the transducer output is required prior to interfacing the transducer with other electronics, such as a microcontroller, for signal processing. For example, piezoresistors used for pressure sensing typically exhibit a low signal amplitude that needs compensation and amplification prior to further signal processing. However, amplification typically introduces undesirable noise into a transducer's output signal and increases the total cost of the pressure sensing application due to the additional electronics required. Accordingly, it is desirable to have a pressure transducer that does not require amplification of its output signal prior to signal processing and that is less expensive to produce than prior pressure transducers.

DETAILED DESCRIPTION OF THE DRAWINGS

Briefly stated, the present invention provides a sensing transducer and a method therefor using a Schottky junction having a conductive layer disposed on a semiconductor substrate. The conductive layer is generally formed from the reaction of a metal with a portion of the semiconductor substrate. In one pressure sensing approach, a substantially constant reverse current is applied to the Schottky junction. The change in output voltage of the junction is proportional to the change in pressure on the junction itself, and can thus be used to sense pressure. This output voltage change is significantly higher than that achieved with prior pressure transducers and permits the output signal of the transducer according to the present invention to be substantially used without amplification or other conditioning.

Figure 1:
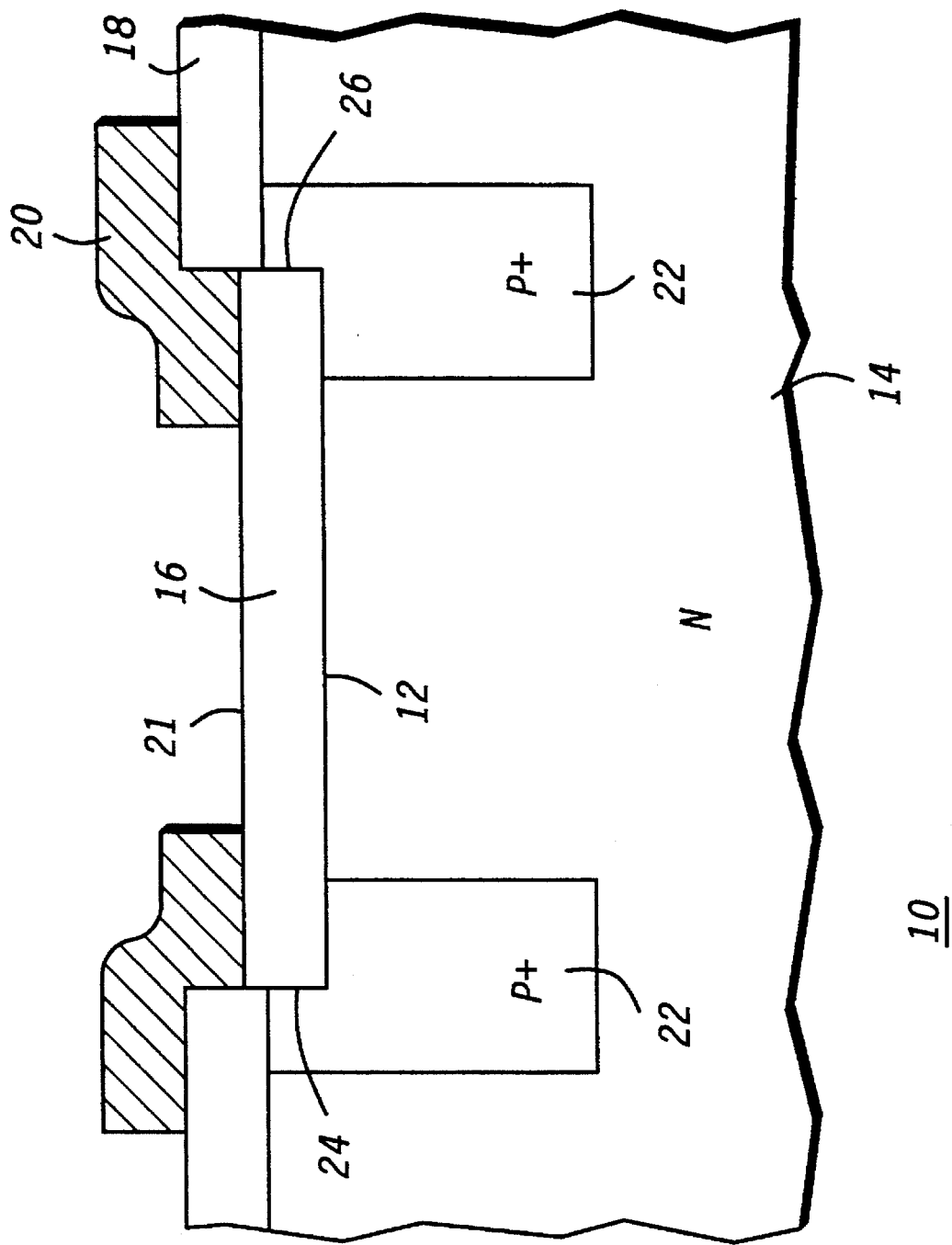
FIG. 1 illustrates a cross-section of a pressure transducer according to a first embodiment of the present invention.

The present invention can be more fully described with reference to FIGS. 1–3. FIG. 1 illustrates a cross-section of a pressure transducer 10 according to a first embodiment of the present invention. A Schottky junction 12 is provided by a conductive layer 16 disposed on a semiconductor substrate 14. An opening has been previously formed in a dielectric layer 18 to define the size of junction 12, and a contact metal 20 is disposed on a top surface 21 of conductive layer 16. A guard ring 22 is disposed proximate to a first edge 24 of junction 12 and a second edge 26 thereof.

Semiconductor substrate 14 is preferably a single-crystalline silicon wafer, but may be an elemental or compound semiconductor in other embodiments. Further, substrate 14 may be an epitaxial layer. In all cases, substrate 14 is doped with an n-type dopant. A preferred dopant concentration for substrate 14, at least in the region underlying junction 12, is about $1 \times 10^{16}$ atoms/cm$^3$. However, this can be lowered to provide a higher breakdown voltage or increased to provide a lower breakdown voltage for junction 12. The breakdown voltage is selected to control power consumption and/or to accommodate specific application needs. For instance, higher breakdown voltages usually have lower leakage currents, and thus lower power consumption.

In general, conductive layer 16 may be formed by reacting an appropriate metal (not shown) with a portion of semiconductor substrate 14. When substrate 14 is silicon, conductive layer 16 will be formed as a metal silicide. A variety of metals can be used to form this metal silicide for conductive layer 16, including a refractory metal (such as titanium, tungsten, chromium, molybdenum, vanadium, or tantalum) or a near-noble metal (such as platinum, palladium, or nickel). Preferred metals for forming conductive layer 16 include platinum, palladium, tungsten, and titanium.

The metal which will be used to form conductive layer 16 may be deposited onto substrate 14, for example, by sputtering, electron-gun evaporation, or molecular beam epitaxy. Also, as will be recognized by one of skill in the art, a compound of this metal (e.g. a silicide or nitride) may alternatively be deposited onto substrate 14. Depositing such a compound rather than a pure metal permits a shallower junction to be formed. The deposition of the metal or its compound is followed by a reaction of the metal (whether from the deposited metal or its compound) with a portion of substrate 14 (such as during a subsequent annealing step) to provide conductive layer 16.

Although silicon is preferred for use as substrate 14, other types of semiconductor substrate materials may be used. In such a case, junction 12 may still be formed by the reaction of a metal, which is appropriate for the particular substrate material chosen, with substrate 14 in the region defined by the opening in dielectric layer 18. The metal or a compound thereof may be deposited as described above. Appropriate metals or their compounds should provide an intimate and uniform contact between conductive layer 16 and substrate 14.

Also, whereas a single-crystalline silicon substrate 14 is generally preferred, in other cases substrate 14 may advantageously be polysilicon. In such cases, the polysilicon layer, which acts as substrate 14 for the region immediately underneath junction 12, is formed on an underlying single-crystalline silicon wafer (not shown). The polysilicon layer preferably has a thickness of about 5–100 nm and is disposed in a sandwich structure between the single-crystalline wafer and conductive layer 16. It is believed that the use of such a polysilicon substrate may improve the sensitivity of junction 12 for sensing pressures below about 150 kPa. This is so because the tensile strength of polysilicon is lower than that of single-crystalline silicon.

The thickness of conductive layer 16 may vary widely depending on the pressure range to be sensed. As an example, for a pressure range of about 3,000–7,000 kPa, the thickness is about 1,000 angstroms. The thickness will be greater for sensing higher pressures and lesser for sensing lower pressures because thinner layers have less damper effects.

Guard ring 22 is provided to eliminate the negative effects associated with premature breakdown of junction 12 at first and second edges 24 and 26. Guard ring 22 has, for example, a p-type dopant concentration of about $1\times10^{17}$ atoms/cm$^3$ so that voltage breakdown will occur in the middle portion of junction 12, rather than first occurring near first or second edges 24 or 26.

Schottky junction 12 may be formed, for example, by the following sequence: Guard ring 22 is formed by a p-type diffusion or ion implantation. Dielectric layer 18 is formed on substrate 14 and then an opening is formed therein. A metal or its compound is formed in a layer overlying dielectric layer 18 and the exposed portion of substrate 14. An annealing step is next performed at an elevated temperature to form conductive layer 16. Finally, the un-needed portion of the metal layer overlying conductive layer 16 is removed. One skilled in the art will recognize that this procedure may generally be followed for any metal selected for use. As only one specific example, platinum may be sputtered onto the exposed substrate 14 and annealed in a nitrogen (or nitrogen-hydrogen) ambient at about 450° C. for about 30 minutes to form a platinum silicide layer. The un-needed platinum is removed by a standard etching process.

Where substrate 14 is a compound semiconductor, the above sequence may generally be used. However, if a non-reactive metal (such as TiN or ZrN) is used, a photolithography process is necessary to remove excess metal from dielectric 18. Examples of annealing temperatures are as follows: titanium is annealed at about 400° C., TiN at about 500° C., and ZrN at about 600° C.

Figure 2:
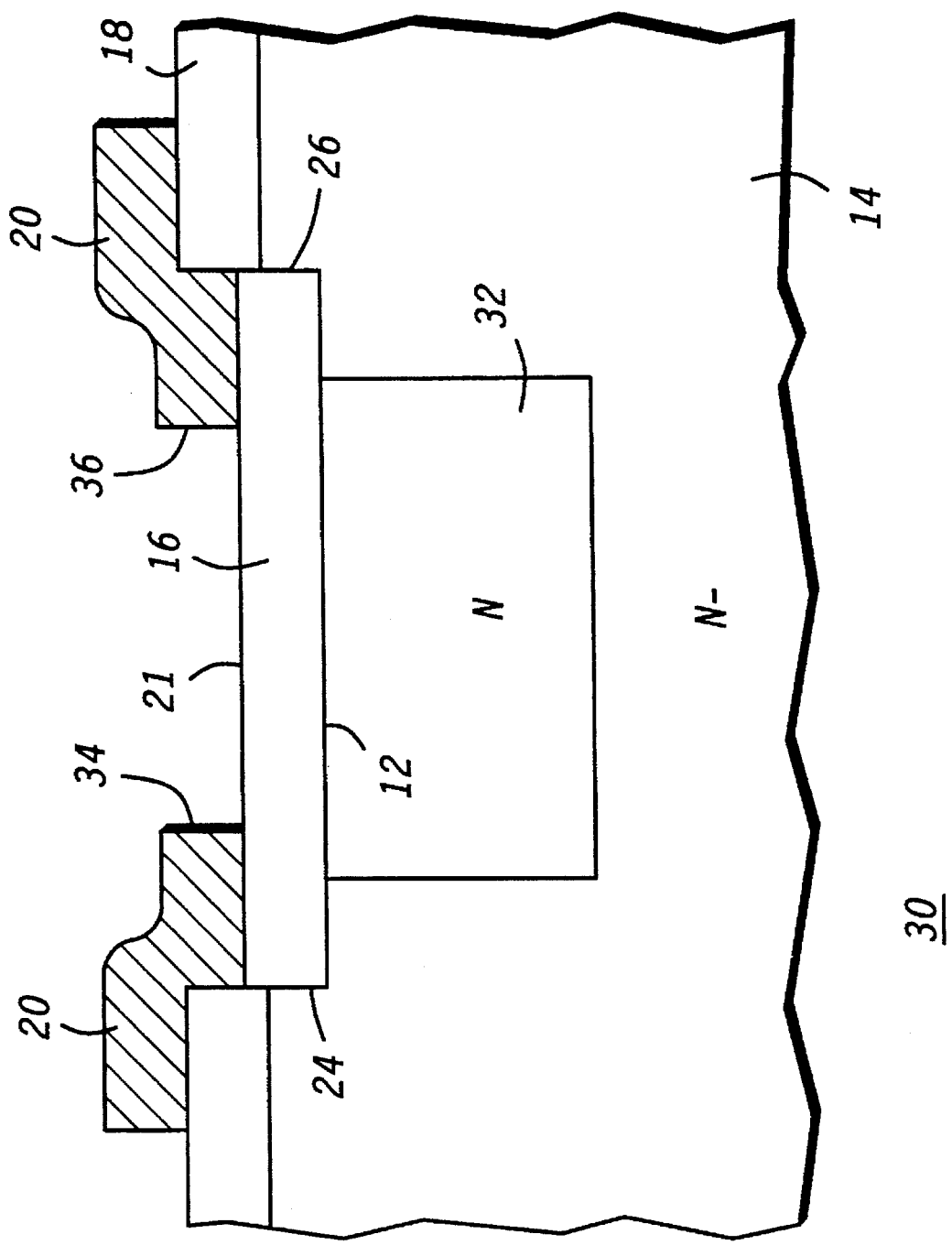
FIG. 2 illustrates a cross-section of a pressure transducer according to a second embodiment of the present invention.

FIG. 2 is a cross-section of a pressure transducer 30 according to a second embodiment of the present invention. Reference numbers from FIG. 1 are used for common elements. Transducer 30 is substantially the same in structure and formation as transducer 10 of FIG. 1. However, the breakdown protection scheme is different in FIG. 2. Here, an n-type region 32 is formed underlying conductive layer 16. Region 32 extends here, for example, at least from a first edge 34 of contact metal 20 to a second edge 36 thereof. Region 32 has a preferred dopant concentration of about $1\times10^{16}$ atoms/cm$^3$ as for transducer 10 above, and the dopant concentration of region 32 is greater than that of substrate 14 by about an order of magnitude. As a result, any voltage breakdown will occur first in the middle portion of junction 12 rather than near first and second edges 24 and 26. This approach permits controlling the breakdown voltage while allowing the use of the same substrate for different devices.

Figure 3:
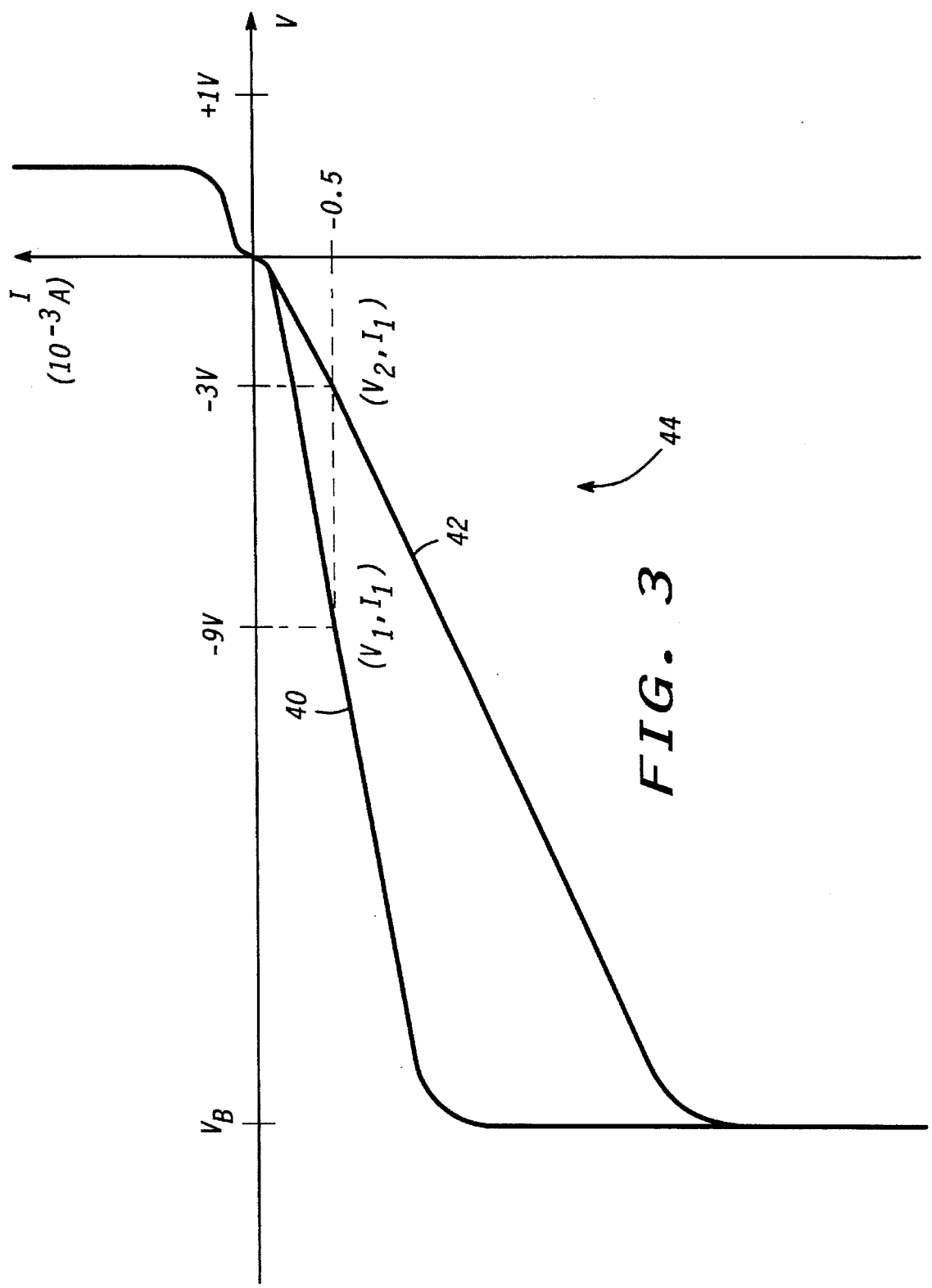
FIG. 3 illustrates two current-voltage characteristic curves for a pressure transducer in two different load states.

FIG. 3 illustrates two current-voltage (I-V) characteristic curves for Schottky junction 12 in two different pressure load states. Curve 40 corresponds to an un-loaded state, such as a reference pressure state (for example, due to an ambient pressure), and curve 42 corresponds to a loaded state at a pressure greater than the reference pressure for curve 40. According to the method of the present invention, pressure changes can be sensed based on the behavior of a reverse bias region 44 of curves 40 and 42. As pressure on junction 12 is increased, the voltage across junction 12 decreases proportionally with the change in pressure.

It is believed that applied pressure on top of conductive layer 16 lowers the Schottky junction energy barrier thickness and consequently, the thermionic-field emission current becomes significant. At some point this emission current dominates over the thermionic current, which increases the leakage current and affects the reverse I-V characteristic of the device. Since the barrier height is constant, the forward I-V characteristic is unchanged. The breakdown voltage for junction 12 is indicated in FIG. 3 as "$V_B$" and is constant, substantially regardless of the applied pressure.

In one approach, pressure may be sensed by applying a constant reverse bias current across junction 12, for example $-0.5$ mA (as indicated in FIG. 3). For a first state (indicated by ($V_1$, $I_1$) on curve 40) the output voltage is $-9$ V. If pressure is increased, then the reverse I-V characteristics change to that shown by curve 42 so that a second state (indicated by ($V_2$, $I_1$) on curve 42) has an output voltage of $-3$ V. Alternatively, one skilled in the art will recognize that a constant reverse voltage could be applied and changes in reverse current detected.

An advantage of the present invention is that substantially any part of the reverse I-V characteristic may be used to measure pressure. Thus, the same device can monitor different pressure ranges while having a substantially constant voltage output span. In other words, the sensitivity of the device can be controlled by varying the constant reverse current applied corresponding to the pressure range to be measured. This permits maintaining a constant voltage output span. For example, small pressure changes cause small changes in the reverse I-V characteristic. Therefore, by using a higher reverse current, signal output span can be maintained. In a similar manner, a larger reverse current is used for large pressure changes.

The output voltages and corresponding currents of junction 12 will depend on many factors including the dopant concentration of substrate 14, the layout area of junction 12, and the geometry selected. However, as a specific example, transducers were prepared by sputtering chromium onto silicon. The opening of the contact junction was about 3.5×3.5 mm$^2$. For 300 micro-amps of constant reverse current, the voltage output was 10 V where no pressure was applied. When a pressure of about 5,000 kPa was applied, the output changed to 5 V. For a current of 400 micro-amps, corresponding voltages were 15.5 V and 8 V. Thus, the output voltage changes for these two currents were 5 and 7.5 V, respectively.

Although one preferred application of transducer 10 or 30 is as a pressure sensor, one skilled in the art will recognize that the present invention may also be applied to load cells or accelerometers. In a typical load cell application, the applied force is transmitted over a constant known area and thus converts the applied force into an applied pressure on conductive layer 16. Similarly, a known mass can be connected to Schottky junction 12 so that acceleration of the mass results in an applied force on junction 12.

One skilled in the art will further recognize that a pressure to be measured may be applied to transducer 10 or 30 in several ways. For example, top surface 21 of conductive layer 16 is preferably directly exposed to the medium having its pressure sensed. However, where the medium to be sensed is electrically or chemically aggressive, a protective passivation layer (not shown), such as silicon gel or parylene, can be deposited on top surface 21. Also, other types of passivation and packaging may be used with the present invention.

It should be noted that as used herein, the term "pressure" is intended to at least include all of the above discussed forms of creating stress in the interface area of junction 12. This stress includes direct application of pressure on top surface 21 and indirect application thereon through passivation or other layers. Also, it has been found that Schottky junction 12 is sensitive to temperature. This sensitivity can be minimized by several known ways: bridge design, compensation, fuzzy logic, or software compression.

A major advantage of the present invention is that the output voltage signal change of the pressure transducer is significantly higher than that for prior pressure transducers. For example, according to the present invention, a pressure transducer having a junction area of about 3.5×3.5 mm² achieves a change in output voltage greater than about 3 V when a reverse current greater than about 300 micro-amps is applied to Schottky junction 12. This is important because the transducer according to the present invention does not require any interface circuitry for connection of its output signal to an analog meter or a digital processing system. This simplifies the manufacture, use, and application of the transducer, in part because there is no additional noise or error introduced by such extra components.

By now, it should be appreciated that there has been provided a novel sensing transducer and method therefor. In addition to the advantages discussed above, this transducer is a two-terminal device and does not require a thin diaphragm. Further, this transducer does not require micromachined parts that will move during operation. This significantly increases its reliability.

As another advantage, the transducer according to the present invention is easily integrated into a digital or analog system disposed on the same silicon die. This is so because the transducer is compatible with both CMOS and bipolar process technology. Moreover, manufacture of the transducer is simple because it requires processing substantially identical to that used in a standard Schottky rectifier production line, and the transducer uses only a small area of a semiconductor die.

We claim:

1. A sensing transducer, comprising:
   a semiconductor substrate;
   a conductive layer disposed on said semiconductor substrate to provide a Schottky junction that is responsive to a substantially uniform pressure on said conductive layer, wherein said conductive layer is a compound formed by a reaction of a metal and a portion of said semiconductor substrate; and
   a contact coupled to said conductive layer.

2. The transducer of claim 1 wherein said semiconductor substrate is a compound semiconductor.

3. The transducer of claim 1 wherein said semiconductor substrate is silicon.

4. The transducer of claim 1 wherein said metal comprises at least one member of a group consisting of a refractory metal and a near-noble metal.

5. The transducer of claim 1 wherein said metal comprises at least one member of a group consisting of platinum, palladium, tungsten, and titanium.

6. The transducer of claim 1 wherein said Schottky junction has a reverse bias characteristic responsive to said pressure.

7. The transducer of claim 1 wherein said conductive layer has a top surface and said pressure is applied to said top surface.

8. The transducer of claim 1 wherein a change in a reverse bias current-voltage characteristic of said Schottky junction corresponds to an output signal from said pressure transducer and is proportional to a change in said pressure.

9. The transducer of claim 1 wherein said semiconductor substrate is polysilicon.

10. The transducer of claim 1 wherein said semiconductor substrate is an epitaxial layer.

11. The transducer of claim 1 wherein said semiconductor substrate has a substantially single-crystalline structure and is doped with an n-type dopant.

12. The transducer of claim 1 further comprising a guard ring disposed proximate to an edge of said Schottky junction.

13. The transducer of claim 1 further comprising a first n-type region underlying said conductive layer, wherein said semiconductor substrate is n-type and said first n-type region has a dopant concentration greater than said semiconductor substrate.

14. The transducer of claim 13 wherein:
    said contact has a first edge and a second edge; and
    said first n-type region extends at least from said first edge to said second edge of said contact.

15. A sensing transducer, comprising:
    an n-type silicon substrate;
    a metal silicide layer disposed on said n-type silicon substrate to provide a Schottky junction that is responsive to a pressure on said Schottky junction, wherein a change in a reverse bias current-voltage characteristic of said Schottky junction corresponds to an output signal from said sensing transducer and is proportional to a change in said pressure; and
    a contact coupled to said metal silicide layer.

16. The transducer of claim 15 wherein said metal silicide layer comprises at least one member of a group consisting of platinum, palladium, tungsten, and titanium.

17. The transducer of claim 16 wherein said n-type silicon substrate has a dopant concentration of about $1\times10^{16}$ atoms/cm³.

18. A method for sensing pressure, comprising the steps of:
    applying a pressure to a Schottky junction wherein said Schottky junction comprises a conductive layer disposed on a semiconductor substrate, said conductive layer being a compound formed by a reaction of a metal and a portion of said semiconductor substrate; and
    generating an electrical signal that is responsive to said pressure, wherein said electrical signal has a magnitude that is a function of said pressure and wherein said electrical signal corresponds to a reverse bias characteristic of said Schottky junction.

19. The method of claim 18 wherein said electrical signal is proportional to said pressure.

20. The method of claim 19 wherein said step of generating an electrical signal comprises applying a substantially constant reverse current to said Schottky junction.

21. The method of claim 18 wherein said electrical signal is a change in output voltage greater than about 3 V for a reverse bias current applied to said Schottky junction of greater than about 300 micro-amps.

\* \* \* \* \*